(12) United States Patent
Schmutz (10) Patent No.: US 6,718,160 B2
(45) Date of Patent: Apr. 6, 2004

(54) AUTOMATIC CONFIGURATION OF BACKHAUL AND GROUNDLINK FREQUENCIES IN A WIRELESS REPEATER

(75) Inventor: Thomas R. Schmutz, Indialantic, FL (US)

(73) Assignee: Airnet Communications Corp., Melbourne, FL (US)

( * ) Notice: Subject to any disclaimer, the term of this patent is extended or adjusted under 35 U.S.C. 154(b) by 357 days.

(21) Appl. No.: 09/747,672

(22) Filed: Dec. 22, 2000

(65) Prior Publication Data

US 2001/0031621 A1 Oct. 18, 2001

Related U.S. Application Data (60) Provisional application No. 60/173,546, filed on Dec. 29, 1999.

(51) Int. Cl.[7] .................................................. H04B 7/15
(52) U.S. Cl. ...................... 455/11.1; 455/16; 455/446; 455/450
(58) Field of Search .............................. 455/41.1, 8, 9, 455/14, 15, 16, 17, 20, 447, 450, 464, 446, 509, 13.3, 13.1, 25, 445, 507, 422.1, 448

(56) References Cited

U.S. PATENT DOCUMENTS

| | | | |
|---|---|---|---|
| 5,943,323 A | * | 8/1999 | Olanders et al. ................ 455/7 |
| 5,970,410 A | | 10/1999 | Carney et al. |
| 6,038,452 A | | 3/2000 | Strawczynski et al. |
| 6,075,989 A | | 6/2000 | Moore et al. |
| 6,088,592 A | * | 7/2000 | Doner et al. ................. 455/447 |
| 6,148,422 A | | 11/2000 | Strawczynski et al. |
| 6,404,775 B1 | * | 6/2002 | Leslie et al. .................... 455/7 |
| 6,469,984 B1 | * | 10/2002 | Baker .......................... 370/315 |

* cited by examiner

Primary Examiner—Nay Maung
Assistant Examiner—John J Lee
(74) Attorney, Agent, or Firm—Sacco & Associates, PA (57) ABSTRACT

A method for automatically configuring a wireless repeater in a cellular communication system includes the steps of selecting a repeater configuration associated with at least one predetermined cell, identifying a specific repeater installed in the predetermined cell, and providing the repeater configuration to the specific repeater using a wireless transmission from a remote control facility. An apparatus includes structures for the automatic configuration of a wireless repeater in a cellular communication system.

25 Claims, 7 Drawing Sheets

AUTOMATIC CONFIGURATION OF BACKHAUL AND GROUNDLINK FREQUENCIES IN A WIRELESS REPEATER

CROSS REFERENCE TO RELATED APPLICATIONS

This application claims the benefit of U.S. Provisional Application No. 60/173,546 entitled "AUTOMATIC CONFIGURATION OF BACKHAUL AND GROUNDLINK FREQUENCIES IN A WIRELESS REPEATER" filed Dec. 29, 1999, the entirety of which is incorporated herein by reference.

STATEMENT REGARDING FEDERALLY SPONSORED RESEARCH OR DEVELOPMENT (Not Applicable)

BACKGROUND OF THE INVENTION

1. Field of the Invention

This invention relates to wireless communication systems, and in particular to a method and apparatus for automatically configuring frequencies used by repeaters in cellular communications systems.

2. Description of Relevant Art

Wireless deployments generally require some level of frequency allocation planning (frequency planning). Frequency planning is typically performed by an RF engineer aided by specialized frequency planning software. Planning software allows estimation of RF propagation levels using models such as link budget models. A frequency plan is determined by also considering and balancing factors including coverage objectives, a carrier density objective (capacity) to serve a given population and the resulting interference ratios from implementation of that plan (quality of service). An acceptable frequency plan provides adequate performance on all the above issues.

The resulting frequency plan is generally programmed into an operation and maintenance center for radio (OMCR). A given frequency plan normally dictates an entire base station system (BSS) coverage area which includes a plurality of base transceiver systems (BTSs). OMCRs generally support a plurality of BTSs. The frequency plan containing configuration data is generally downloaded to the BTSs via a data link which can be fixed (e.g. T1) or wireless. If a wireless data link is used, the data link used to transmit frequency plan information to each BTS is not "in-band." As used herein, the term "in-band" refers to carrier frequencies that are within the frequency spectrum allocation assigned to the service provider for providing cellular communications services to mobile subscribers.

The frequency configuration data is transferred to the BTS over the selected data link from a central location. The data link itself generally never changes. For example, if a wireless microwave link is used, the microwave frequency used will not change when the frequency configuration of the BTS changes.

Frequency plans are created for a given coverage area and are subject to change. For example, as one or more BTSs or carrier frequencies are added, removed or physically relocated, frequency plans must generally be updated. Frequency plans may also be changed to optimize capacity, coverage or quality of service, or all of these factors simultaneously.

Some cellular systems advantageously include repeaters in addition to BTSs. For example, when a wireless system is first installed, the demand for its use in most cells can be relatively low. Because only a few cells at high expected traffic demand locations (such as at a freeway intersection) can justify the expense of a build-out deploying a high capacity BTS per cell, a service provider can opt to extend the service area and efficiency of a given BTS through use of comparatively low cost repeaters. A preferred type of repeater is a translating repeater. Translating repeaters minimize undesirable multi-path effects compared to non-translating repeaters. Using repeaters, a home base station location is identified within each cluster of cells, rather than by deployment of a complete suite of broadband base station equipment in each cell in the cluster. A plurality of inexpensive translating repeater units can be located in the low traffic density cells and serviced by a home base station. Communications between base stations and translating repeaters is generally referred to as backhaul communications, while communications between translating repeaters and mobile users is generally referred to as groundlink communications.

When initially deployed in the field, current translating repeaters are not preconfigured to transmit and receive signals on specific frequencies for both groundlink and backhaul channel communications. As noted earlier, these specific frequencies are allocated to translating repeaters based on a given frequency allocation plan. Thus, to configure the frequencies for a translating repeater, a technician is required to manually set the frequencies for use by each translating repeater. The configuration provides the translating repeater with one or more groundlink channels for communicating with mobile stations within the translating repeater's coverage area. The technician is also required to manually configure one or more backhaul channels for the translating repeater communications with the BTS with which it is affiliated.

An installation technician typically manually configures specific translating repeater backhaul and groundlink channels from the cellular system's frequency plan by traveling to each translator repeater site. Once on site, the technician generally uses a laptop or handheld computer which can be hardwire connected to the translating repeater through a serial port to input the required frequencies.

The installation technician must be trained to configure these frequency channels and test the resulting configuration to ensure that the desired configuration is actually realized. Training installation technicians can be costly. Moreover, there may be subsequent changes in the frequency plan affecting cells in which translating repeaters are situated. As in the initial configuration situation, a technician is required to travel to the affected translating repeater sites to manually reconfigure the groundlink and backhaul channels. Thus, manually configuring or reconfiguring translating repeater frequencies is generally an expensive and time-consuming task.

If the groundlink and backhaul channel frequencies of translating repeaters were not required to be manually set, the efficiency of both configuration and reconfiguration of the groundlink and/or backhaul frequency channels allocated to translating repeaters could be greatly improved. A method and apparatus for automatically configuring groundlink and backhaul frequencies for translating repeaters using wireless signaling would save both time and money, compared to manual configurations.

SUMMARY OF THE INVENTION

The invention concerns a method and apparatus for automatically configuring a wireless repeater in a cellular communication system. The method comprises the steps of selecting a repeater configuration associated with at least one predetermined cell, identifying a specific repeater installed in the predetermined cell, and providing the repeater configuration to the specific repeater using a wireless transmission from a remote control facility. The repeater configuration can include at least one selected from the group consisting of a neighbor list, at least one groundlink channel, at least one backhaul channel, handover thresholds, alarm thresholds, alarm masks and at least one backhaul power level.

The method can further comprise the step of storing the repeater configuration at the remote control facility. The remote control facility can be a base transceiver station (BTS). The specified repeater can identify the repeater configuration it is intended to use through the time interval used by the BTS wireless transmission or through receiving an identifying code included in the BTS wireless transmission.

The providing of the repeater configuration can be responsive to a wireless configuration request transmitted by the specified repeater. The specified repeater can be identified from the configuration request. The channel to be used for transmission of the repeater's configuration request can be identified by the specified repeater by scanning through a list of frequencies transmitted by the BTS. The configuration request can be transmitted over at least one control channel. Alternatively, the configuration request can be sent over a channel reserved for configuration requests.

An apparatus for automatically configuring a wireless repeater in a cellular communication system comprises a structure for selecting a repeater configuration associated with at least one predetermined cell, a structure for identifying a specific repeater installed in the predetermined cell, and a structure for providing the repeater configuration to the specific repeater using a wireless transmission from a remote control facility. The repeater configuration can include at least one selected from the group consisting of a neighbor list, at least one groundlink channel, at least one backhaul channel, handover thresholds, alarm thresholds, alarm masks and at least one backhaul power level. The apparatus for automatically configuring a repeater can further comprise a structure for storing the repeater configuration at the remote control facility.

The remote control facility can be a BTS. The specified repeater can identify the repeater configuration through the time interval used by the BTS wireless transmission. Alternatively, the specified repeater can identify the repeater configuration through receipt of a signal which includes an identifying code included in the BTS wireless transmission. The structure for providing the repeater configuration can transmit a signal responsive to a wireless configuration request transmitted by a specified repeater. The specified repeater can be identified from the configuration request. The configuration request can include an electronic serial number (ESN) assigned to a specified repeater. The specified repeater can be identified through a time interval used during transmission of the configuration request. The configuration request can be transmitted over a channel identified by the specified repeater by scanning through a list of frequencies transmitted by the BTS. The configuration request can be transmitted over at least one control channel. The configuration request can also be sent over a channel reserved for configuration requests.

BRIEF DESCRIPTION OF THE DRAWINGS

Features and advantages of the present invention will become apparent to those skilled in the art from the following description with reference to the drawings, in which.

DETAILED DESCRIPTION OF PREFERRED EMBODIMENTS

Figure 1:
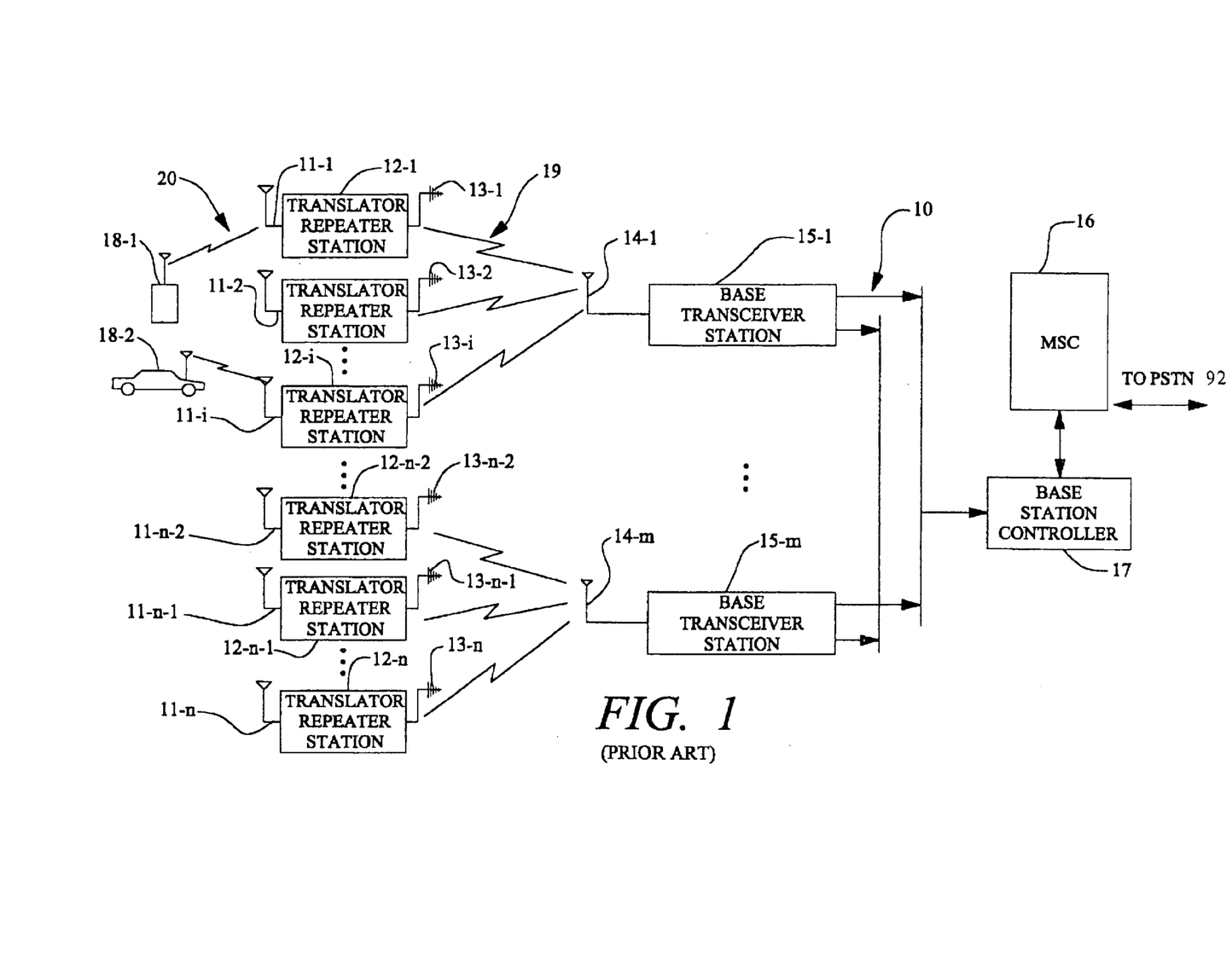
FIG. 1 is a block diagram of a wireless communications system deploying a plurality of wireless translating repeaters and base transceiver stations.

FIG. 1 is a block diagram of a conventional wireless communications system such as a Personal Communication System ("PCS") or other similar system 10. In this system, omni-directional translating repeaters 12-1 . . . 12-n are deployed in peripheral cells surrounding broadband base transceiver stations ("BTS"), such as 15-1 . . . 15-m. Clusters of cells are each supported by a plurality of translating repeaters 12-1 . . . 12-i. Cell clusters are generally associated with a single BTS, such as 15-1. Translating repeaters within a cell cluster are generally exclusively served or hosted by a "host BTS" positioned within a given cell cluster.

Cells having BTS 15-1 . . . 15-m positioned therein, generally do not require translating repeaters 12-1 . . . 12-n. Those skilled in the art will readily appreciate that non-translating repeaters or directional or sectorized translating repeaters may replace omni-directional translating repeaters 12-1 . . . 12-n in this system. However, for convenience, the system 10 will first be described using omni-directional translating repeaters 12-1 . . . 12-n.

The system 10 can include translator omni-directional antennas 11-1, 11-2 . . . 11-i, . . . 11-n-2, 11-n-1 and 11-n (collectively omni-directional antennas 11), translating repeaters 12-1, 12-2, . . . 12-i, . . . 12-n-2, 12-n-1 and 12-n (collectively translating repeater 12), translating repeater antennas 13-1, 13-2, . . . 13-i, . . . 13-n-2, 13-n-1 and 13-n (collectively translating repeater directional antennas 13), BTS directional antennas 14-1, . . . 14-m (collectively BTS antennas 14), and broadband base transceiver stations 15-1, . . . 15-m (collectively BTSs 15). The system 10 can further include a mobile telephone exchange/mobile telephone switching office ("MTSO") 16, one or more base station controllers 17 and a plurality of mobile users 18-1 and 18-2.

Translating repeaters 12 conventionally receive radio signals from mobile users 18 through omni-directional antennas 11 and forward a frequency shifted version of the received signal to BTS 15 through translating repeater directional antennas 13. Likewise, radio signals transmitted from BTS 15 through BTS antennas 14 are frequency shifted by translating repeater 12 and forwarded to mobile users 18. BTS 15 demodulate signals received from translating repeaters 12 through BTS antennas 14 and connect these signals to the Public Switched Telephone Network 92 ("PSTN")

through MTSO 16. In addition, in the transmit direction, BTS 15 modulates signals received from the PSTN 92 through MTSO 16 to format them for transmission through BTS antennas 14-1 . . . 14-m to their respective hosted translating repeaters 12.

Figure 2:
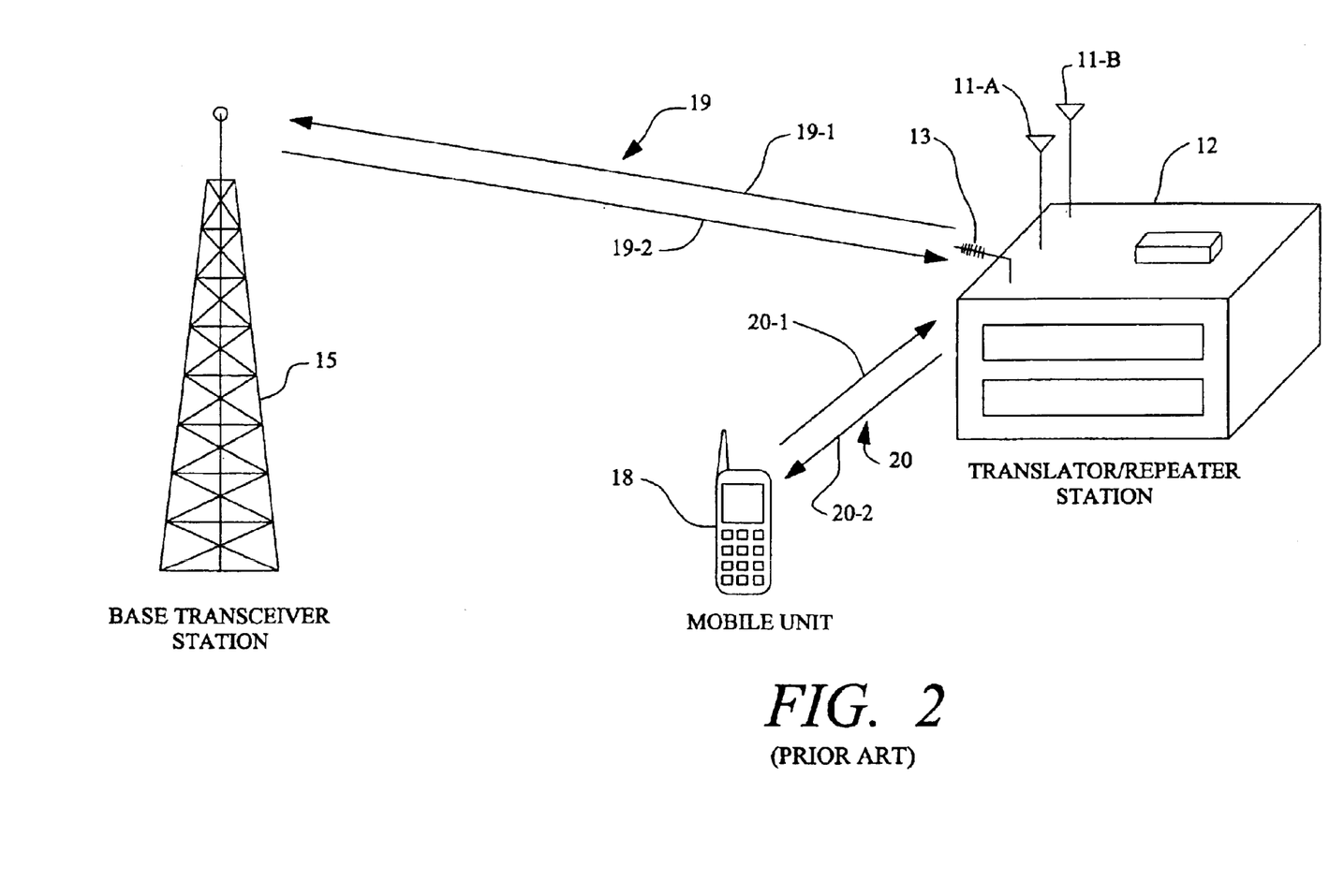
FIG. 2 is an exemplary arrangement of the wireless communications system of FIG. 1, showing wireless links deployed through a translating repeater.

FIG. 2 illustrates the basic function of a translating repeater 12. Frequency shifted signals transmitted by translator repeaters 12 avoid multi-path effects common in cellular systems using simple repeaters. Applied to translating repeaters, a frequency pair or duplex frequency is used so that BTS 15 to translating repeater 12 backhaul transmissions are at a different frequency than translating repeater 12 to BTS backhaul transmissions 15. Each backhaul signal is simply a frequency-shifted version of the same signal received by the mobile user 18 on the downlink, and a frequency shifted version of the same signal transmitted by the mobile user 18 on the uplink.

Translating repeater 12 transmits a frequency-shifted version of the signals received from mobile users 18 to BTS 15 and receives signals from BTS 15 through backhaul channel 19. Backhaul channel 19 is comprised of uplink backhaul channel 19-1 and downlink backhaul channel 19-2. Preferably, different carrier frequencies are used for uplink backhaul channel 19-1 and downlink backhaul channel 19-2. Similarly, translating repeater 12 transmits a frequency-shifted version of signals received from BTS 15 to mobile users 18 and receives signals from mobile users 18 through groundlink channel 20. Groundlink channel 20 is comprised of uplink groundlink channel 20-1 and downlink ground channel 20-2, preferably deployed using different carrier frequencies to allow simultaneous transmission in both directions.

Because BTS 15 is generally stationary, translating repeaters 12 preferably employ directional antennas 13 pointed towards BTS 15 to improve transmission and reception of signals over backhaul channel 19. In contrast, because mobile users 18 are not stationary and the translating repeater 12 is not sectorized, translating repeater 12 preferably employs one or more omni-directional antennas 11A and 11B respectively to transmit and receive signals over groundlink channel 20.

Figure 3A:
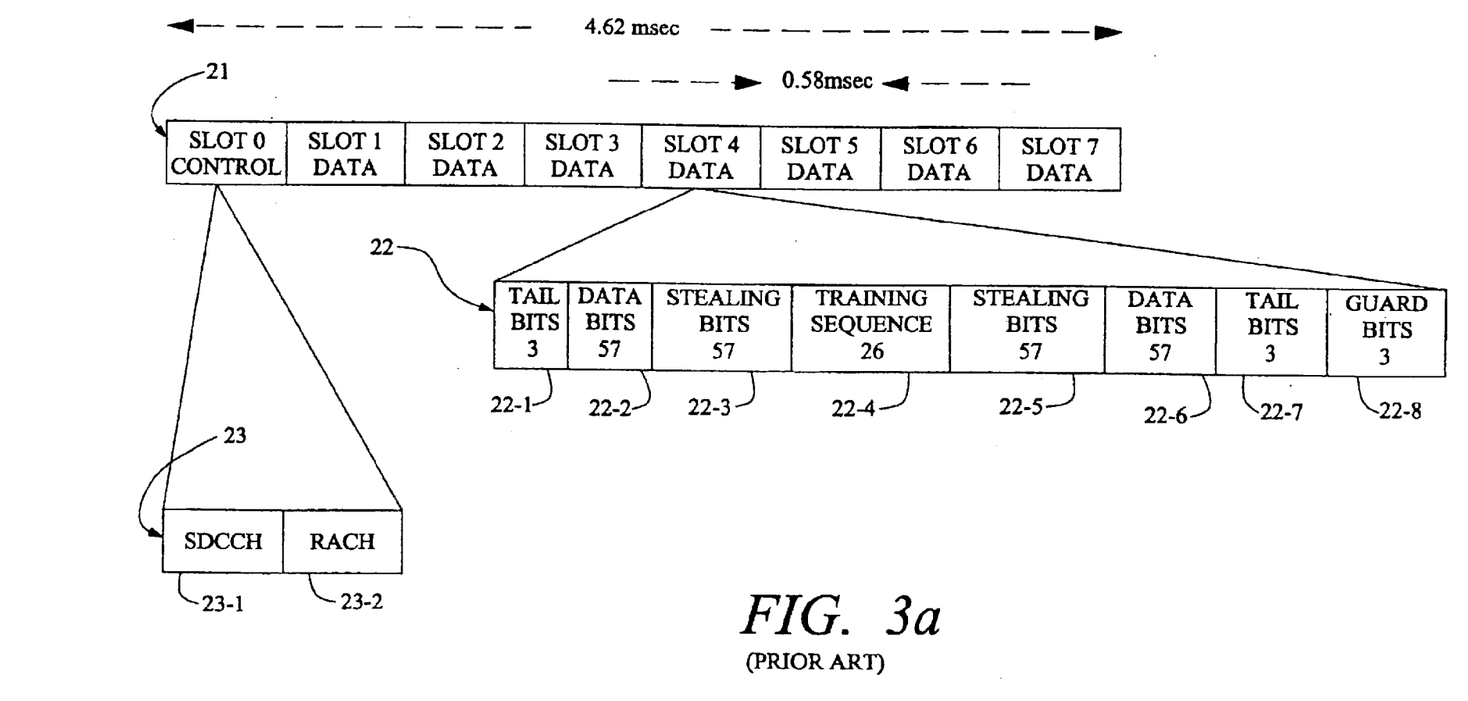
FIG. 3a illustrates an uplink GSM-type TDMA frame which includes a dedicated control channel.

Communications between mobile users 18, repeaters 12, and the BTS 15 can be performed using a variety of multiplexing schemes that are well known in the art. For example, a time division multiplex (TDM) scheme may be used for this purpose. FIG. 3a shows a typical uplink backhaul GSM TDMA frame 21 comprising eight time slots, used for transmission from a translating repeater 12 to BTS 15. The depicted GSM TDMA frame has a duration of 4.62 milliseconds, comprising eight time slots each having a duration of approximately 0.58 milliseconds. Generally, for GSM-type TDMA implementations which use a single RF carrier, one time slot is dedicated to transmitting control information, while the remaining slots are available to transmit traffic information. Traffic channels can carry conversations or data, as well as information about the time slot itself.

Referring to FIG. 3a, slot 0 is a dedicated control channel while slots 1–7 support traffic. Typical formats for the traffic sub-channels and control sub-channels are shown in time slot details 22 and 23, respectively. Detail 22 of time slot 4 shows typical GSM format traffic sub-channels including tail bits 22-1 and 22-7 which are used to indicate the beginning and end of a time slot. Data bits 22-2 and 22-6 contain the digitized call information, while training sequence bits 22-4 are used for equalization of multi-path signals. Stealing bits 22-3 and 22-5 are provided to indicate if suppression of time slot data and replacement with priority data is requested. Finally, guard bits 22-8 are provided to keep the individual slots from overlapping upon receipt. The number of bits contained in a typical traffic sub-channel is shown below the sub-channel designation in detail 22.

As noted earlier, in single TDMA RF carrier implementations, one slot will generally be a dedicated digital control channel. As shown in detail 23 of time slot 0, sub-channels in the uplink control time slot generally include a stand-alone dedicated control sub-channel (SDCCH) 23-1 and a random access sub-channel (RACH) 23-2. The SDCCH sub-channel 23-1 is used to transport information between the BTS 15 and specific mobile users 18 to complete call set up or for transmission of messages from a mobile user 18 in idle mode. The RACH sub-channel 23-2 is used by the mobile user to request access to the network during initial call set up.

Figure 3B:
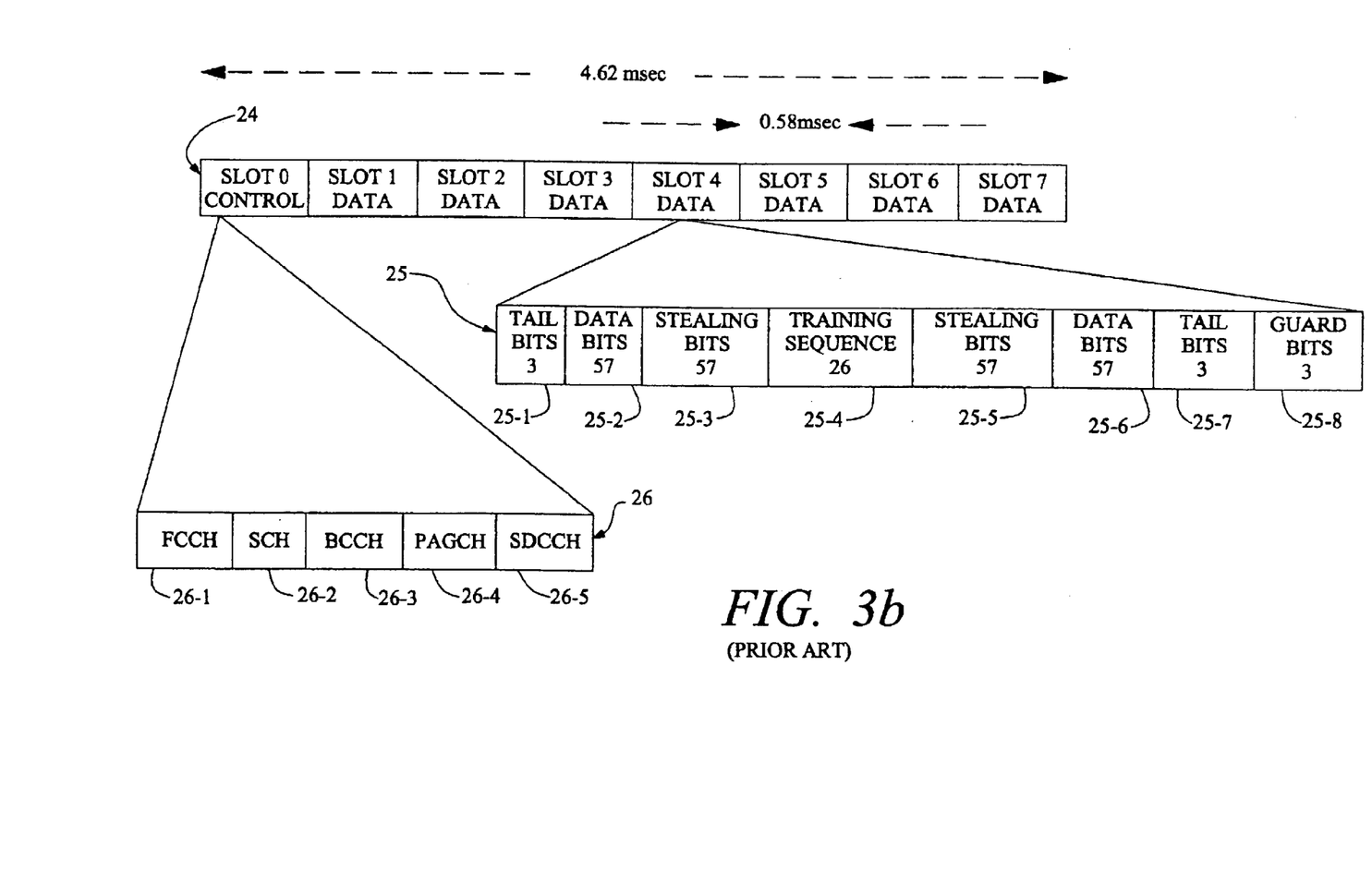
FIG. 3b illustrates a downlink GSM-type TDMA frame which includes a dedicated control channel.

FIG. 3b shows a typical GSM-type eight time slot TDMA frame 24 used in base station 15 to translator repeater 12 communications. Generally, the information format in the traffic time slots 1–7 remains the same compared to uplink traffic channels shown in FIG. 3a. However, more control sub-channels are included in the control time slot 0 as shown in detail 26 in FIG. 3b, compared to the corresponding uplink control channel shown in detail 23 of FIG. 3a. Specifically, as shown in FIG. 3b, downlink control time slot 0 is comprised of frequency correction sub-channel (FCCH) 26-1, synchronization sub-channel (SCH) 26-2, broadcast control sub-channel (BCCH) 26-3, paging and access grant sub-channel (PAGCH) 26-4 and SDCCH sub-channel 26-5. The FCCH sub-channel 26-1 transmits frequency correction information (through translating repeater 12) for a mobile user 18 to correct its time base, while the SCH 26-2 sub-channel transmits (through translating repeater 12) synchronization information for the mobile to synchronize to the framing structure of the network. The BCCH 26-3 sub-channel transmits (through translating repeater 12) information to idle mobile users 18 such as local area identification and neighbor cell information. Finally, the PAGCH 26-4 sub-channel is used (through translating repeater 12) to page a mobile user 18 and grant access to a mobile user 18 during call set up.

Figure 4:
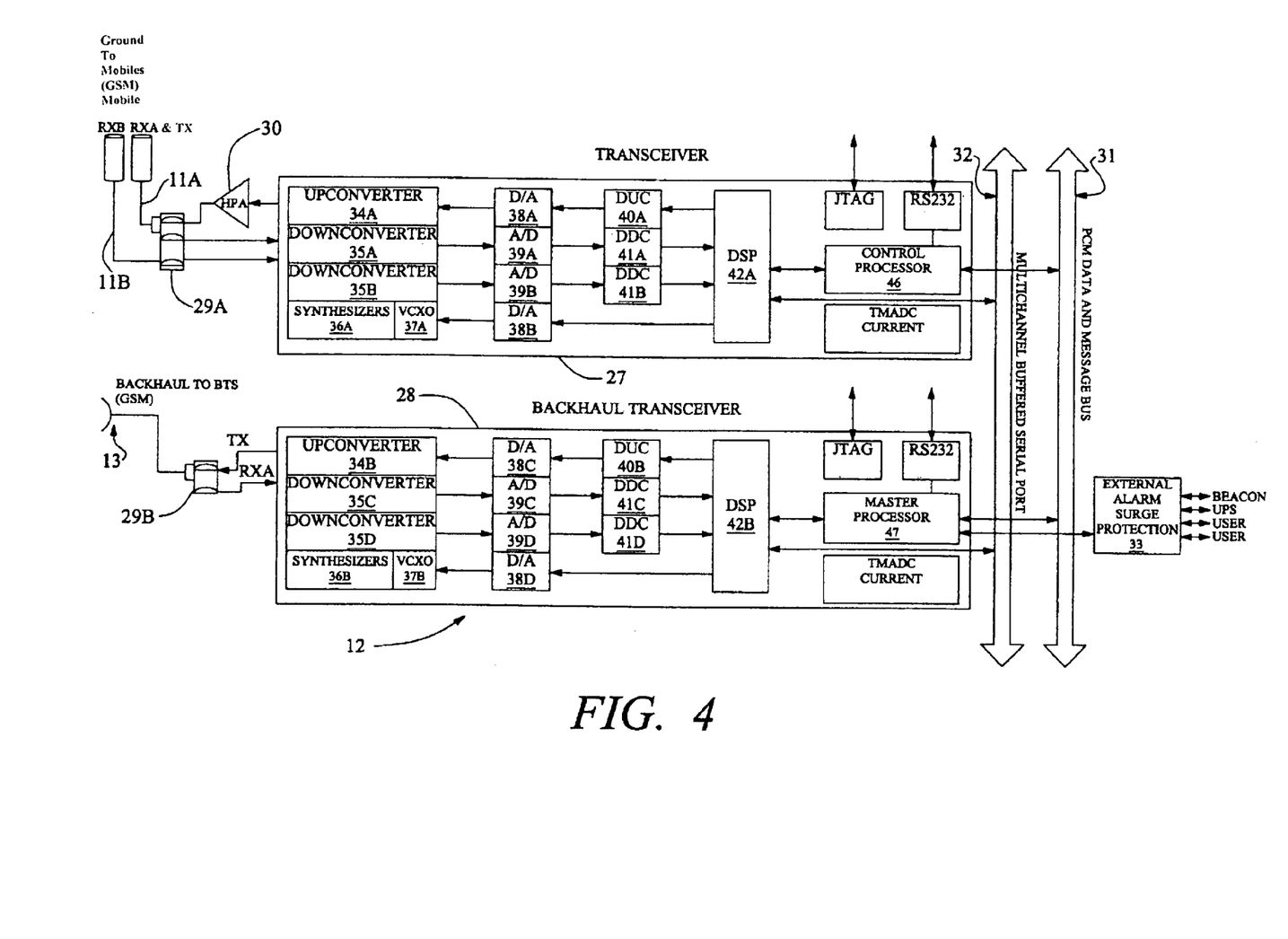
FIG. 4 is a detailed block diagram of a translating repeater of the type shown in the wireless communication system of FIG. 1.

FIG. 4 is a block diagram of a translating repeater 12 which can be used in connection with the present invention. Translating repeater 12 can comprise a ground sector transceiver 27 for communications with mobile users 18 and backhaul transceiver 28 for communications with host BTS 15. It will readily be appreciated by those skilled in the art that the particular transceiver architecture shown is not critical to the invention and the invention as described herein is not intended to be so limited.

In a preferred embodiment, transceivers 27 and 28 are each capable of transmitting and receiving over a broad range of carrier frequencies allocated to a service provider for multi-carrier operation. However, the invention is not limited in this regard and more narrowbanded transceivers can also be used for the purposes of the present invention. Each transceiver 27, 28 is preferably configured so that its operation can be controlled by control processor and master processor, 46 and 47, respectively.

FIG. 4 shows a single sector omni-directional translating repeater 12 according to a preferred embodiment of the invention, it being understood that the invention is not so limited. In the receive direction, voice or data signals are encoded and transmitted by mobile users 18 using a standard wireless telephony format such as GSM. Mobile signals are received by omni-directional antenna 11A and 11B. Received signals pass through cavity filter 29A to downconverter 35A or, alternatively, 35B where, in conjunction with synthesizer module 36A and voltage-controlled crystal oscillator 37A, the signal is mixed down to intermediate frequency or IF. A high-speed analog-to-digital converter 39A (or 39B) then converts the analog IF signal into a digital signal. Once the IF signal is digitized, digital downconverter 41A (or 41B) translates the signal down to a complex baseband signal. Digital downconverter 41 preferably provides the ability to downconvert, decimate, filter and control the power level of the signal. After conversion to complex baseband, the signal is demodulated by digital signal processor 42A. Digital signal processor 42A is configured for decoding the received signal data from the standard wireless telephony format, such as GSM, to a common format used internally within translating repeaters 12.

The common format data is then transferred over multi-channel buffered serial port 32 to digital signal processor 42B in backhaul transceiver 28. The signal is re-modulated by digital signal processor 42B. The re-modulated signal is output as a complex baseband signal and translated to real IF by digital upconverter 40B. After the signal is translated to real IF, digital-to-analog converter 38C (or 38D) converts the signal back to an analog signal where it is mixed by upconverter 34B in conjunction with synthesizer module 36B and voltage-controlled crystal oscillator 37B to RF. The signal then passes through cavity filter 29B and is transmitted via translating repeater directional antenna 13 on uplink backhaul channel 19-1 to host BTS 15.

Transceivers 27 and 28 are preferably controlled by one or more control circuits. The control circuits can be in the form of general purpose computers interfaced with the transceiver, a programmable microprocessor integrated with the transceivers with appropriate software, a hardware based controller, or any other combination of microprocessors, electronic circuitry and programming as may be necessary or appropriate for controlling the first and second transceivers.

As shown in FIG. 4, the control circuits include master processor 47 and control processor 46. Master processor 47 preferably controls the operation of backhaul transceiver 28, including selection of transmit and receive frequencies. Master processor 47 is also preferably linked with PCM data and message bus 31 so that it can communicate with control processor 46, and vice versa. Control processor 46 is preferably a slave processor controlled by master processor 47. Control processor 46 can also preferably control the operation of ground sector transceiver 27, including the selection of transceiver receive and transmit frequencies.

Frequency translation of signals by translating repeater 12 received from the BTS 15 through the backhaul channel 19-2 is similar to the procedure employed to translate signals received from mobile users 18. Specifically, a signal is received from BTS 15 at translator directional antenna 13 attached to backhaul transceiver 28. The signal passes through cavity filter 29B to downconverter 35C (or 35D) where, in conjunction with synthesizer module 36B and voltage-controlled crystal oscillator 37B, the signal is mixed down to IF. Analog-to-digital converter 39C (or 39D) converts the analog IF signal to a digital signal where it is subsequently processed by digital downconverter 41C (or 41D) to complex baseband.

Once converted into complex baseband, the signal is demodulated by digital signal processor 42B and transferred to digital signal processor 42A over multi-channel buffered serial port 32. The signal is then re-modulated by digital signal processor 42A and translated from complex baseband to real IF by digital upconverter 40A. After the signal is translated to real IF, digital-to-analog converter 38A (or 38B) converts the signal back to an analog signal. Upconverter 34A, synthesizer 36A, and voltage-controlled crystal oscillator 37A operate together to mix the signal to RF for transmission. The signal is then amplified by high-power amplifier 30, filtered by cavity filter 29A and transmitted from omni-directional antenna 11A to the mobile user 18 through groundlink channel 20-2.

Figure 5:
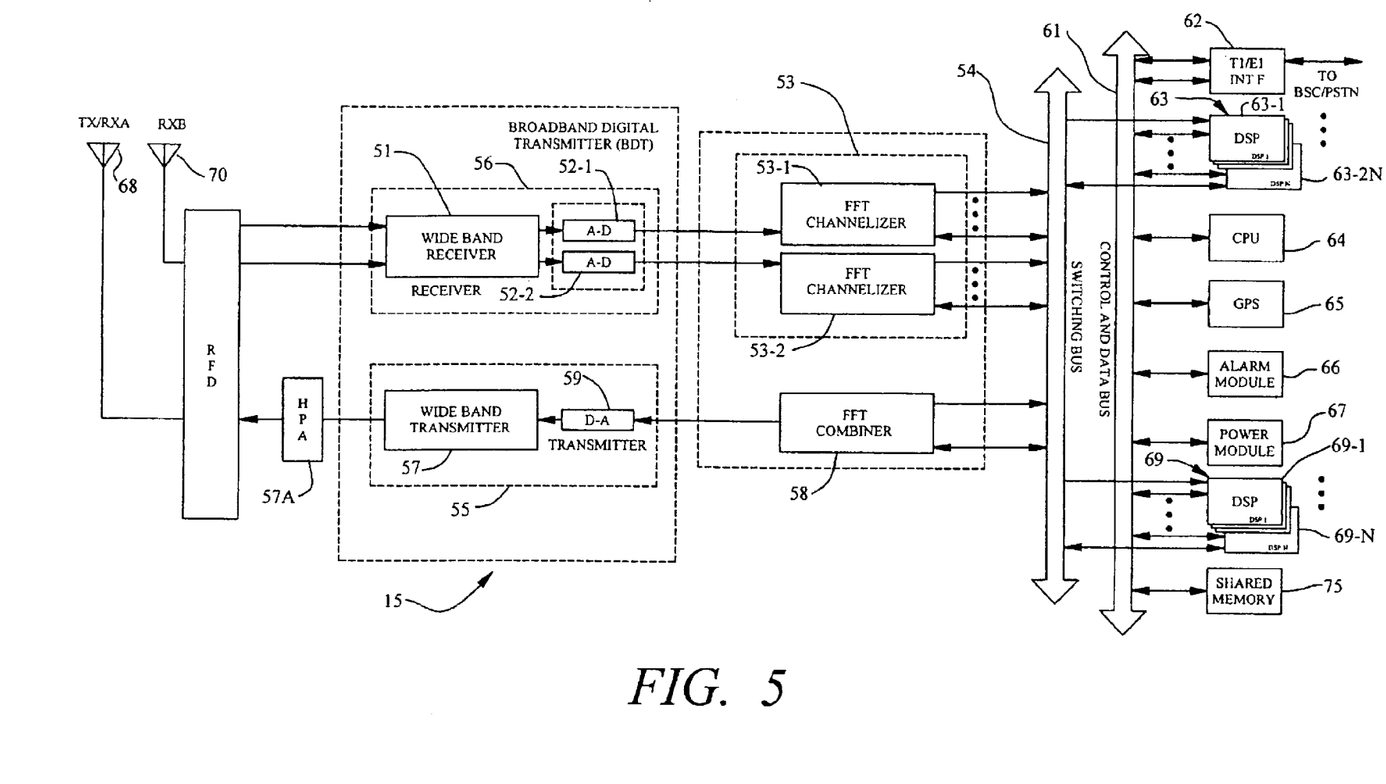
FIG. 5 is a block diagram of a base transceiver station of the type shown in the wireless communication system of FIG. 1.

Referring now to FIG. 5, a simplified block diagram of a broadband BTS 15 is illustrated, which comprises a receiver section 56 and a transmitter section 55. It will be readily appreciated by those skilled in the art that the particular transceiver architecture shown is not critical. Accordingly, the invention disclosed herein is not intended to be so limited. Receiver section 56 preferably includes antennas 68, 70 and a wideband receiver 51 capable of receiving a plurality of carrier frequency channels. Signals from the received channels can include new power requests, power adjustment requests and traffic channel data originating from mobile users 18.

The output of the wideband receiver 51 is downconverted and then preferably coupled to high speed A–D converters 52-1 and 52-2 which can be operated in parallel for diversity receive capability. Where diversity capability is not desired, a single A–D converted 52-1 can be utilized. Additionally, more than one parallel leg may be required for sectorized applications.

The channelized outputs from the A–D converters 52-1 and 52-2 are preferably input to FFT channelizers 53-1 and 53-2 which extract respective narrowband carrier frequency channel signals from the composite digitized multi-channel signals. The respective carrier frequency channel signals are then coupled via N output links through a common data bus 61 to respective digital signal processing receiver units 63-1 . . . 63-2N, each of which demodulates the received signal and perform any associated error correction processing embedded in the modulated signal.

The transmitter section 55 includes a second plurality of digital signal processing units, specifically, transmitter digital signal processing units 69-1 . . . 69-N. Transmitter digital signal processing units 69 are coupled to receive from the telephony network respective ones of a plurality of channels containing digital voice/data communication signals to be transmitted over respectively different individual carrier frequency channels of the multi-channel network. Transmitter digital signal processing units 69 modulate and perform pre-transmission error correction processing on respective incoming communication signals, and supply processed carrier frequency channel signals over the common bus 54 to preferably respective input ports of an inverse FFT-based multi-channel combiner unit 58. The combiner 58 outputs a composite multi-channel digital signal to digital-to-analog (D-A) converter 59. The output of D-A converter 59 is coupled to a wideband (multi-channel) transmitter unit 57, which can include or have a separate multi-channel high power amplifier (HPA) 57A. The transmitter unit 57 transmits a wideband (multi-channel) communication channel signal defined by the composite signal output of the inverse fast Fourier transform-based combiner unit 58. The output of the HPA 57A is then coupled to antenna 68 for transmission.

Figure 6:
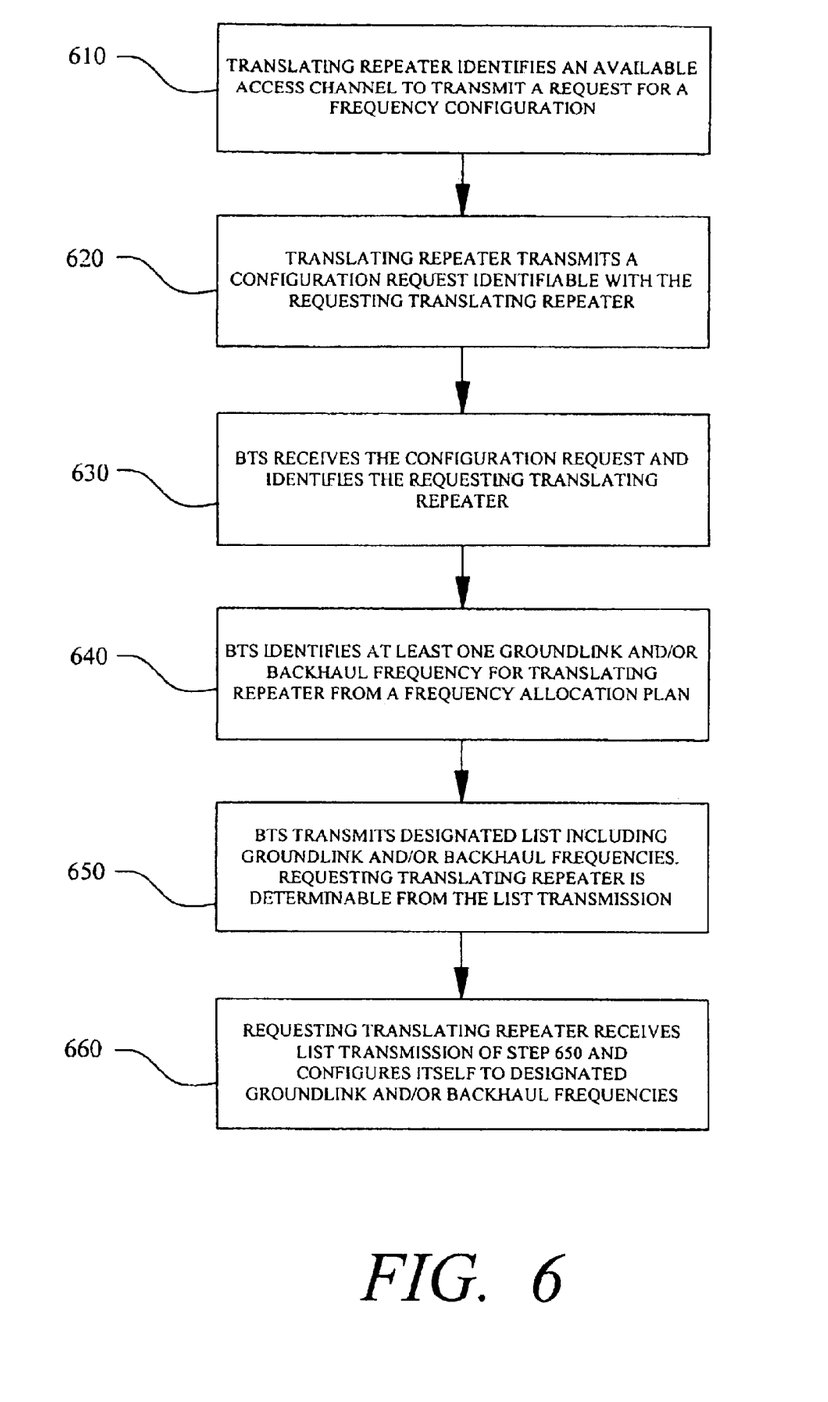
FIG. 6 is a flow chart describing a method for initially configuring translating repeaters with designated groundlink and backhaul frequencies automatically.

Now referring to FIG. 6, a method is provided for automatically configuring the backhaul and groundlink frequencies for a repeater 12 upon powering up using in-band wireless signaling. The invention permits translating repeaters 12 to be deployed at a desired site and simply turned on without a requirement for a technician to visit the site and manually configure assigned backhaul and groundlink frequencies. In addition, the invention permits the actual configuration link frequencies used by the serving remote control facility, for transmitting backhaul and groundlink frequency information to repeaters 12 selected from a plurality of in-band carrier frequencies.

In the preferred embodiment of the invention, translating repeaters are used. Accordingly, the invention will be described through use of translating repeaters. However, it is understood the invention is also applicable to non-translating repeaters.

In step 610, upon powering up, translating repeater 12 identifies an available access channel to transmit a configuration request to a remote control facility, such as BTS 15. Alternatively, the remote control facility can be the cellular system's operation and maintenance center for radio (OMCR). In the preferred embodiment of the invention, the remote control facility is a BTS 15. In TDMA systems, such as GSM, a channel refers to a timeslot of a given frequency carrier. Time slots can be further divided into a plurality of sub-channels as shown in FIGS. 3A and 3B.

The configuration request can preferably be transmitted on a default channel or sub-channel reserved for exclusively transmitting configuration requests. For example, one or more dedicated timeslots or portions of timeslots on a control multi-frame can be used for this purpose. Alternatively, the translating repeater 12 can scan the various frequency channels supported by BTS 15 to identify an available access channel or sub-channel to transmit the configuration request. This latter approach is analogous to the method generally used by mobile users 18 upon powering up, when a mobile user 18 is seeking to initiate contact with a BTS 15 and register itself as a mobile user 18 within that cell or coverage area. In the scanning method, the translating repeater 12 scans the individual frequencies, each time attempting to decode the downlink control signal sent by BTS 15 in order to find an available access channel or sub-channel, such as a control channel or sub-channel, upon which to transmit the configuration request.

In step 620, a requesting translating repeater 12 transmits a signal capable of being identified with the requesting translating repeater to BTS 15. The signal identifies the particular translating repeater 12 with which it is associated and indicates that the requesting translating repeater 12 is ready to be configured. If a control channel is used, once the control channel is identified, the translating repeater preferably transmits a burst having a duration less than one time slot to BTS 15. The short burst includes an identifier associated with the requesting translating repeater 12. The short burst transmitted by translating repeater 12 acknowledges that the translator repeater 12 is on-line and awaiting directions as to the appropriate frequency channels or absolute RF channel numbers (ARFCNs), to which the translating repeater 12 should set its groundlink and/or backhaul frequencies.

The identifier transmitted by the translating repeater 12 can be any signal code selected by the cellular system operator which is suitable to permit identification of the requesting translating repeater by BTS 15. For example, a unique registration or electronic serial number (ESN) may be used by each translating repeater 12. Alternatively, a given translating repeater 12 may be identified without the use of registration or ESN bit string by transmitting configuration request signals on identifiable time intervals. For example, specific TDMA time slots or specific TDMA sub-time slots may be assigned for exclusive use by specific translating repeater 12.

For example, for a cellular system comprising a BTS 15 and seven translating repeaters 12-1 to 12-7, portions of sub-channels can be identified with a specific translating repeater 12. The portion of sub-time slot represented by the first ⅐ of a sub-time slot normally allocated to a specific sub-channel, such as RACH 23-2, in each control time slot may be identified with a specific translating repeater, such as 12-1. Similarly, the second ⅐ of each control sub-time slot may be identified within the system with translating repeater 12-2, and so on.

As a further alternative, a given sub-time slot in a control channel, such as 23, on periodically spaced frames may be identified with a specific translating repeater 12. Thus, if translating repeater 12-1 is assigned to the control channel in frames 1, 9, 17, 25, etc., control signals sent to BTS 15 on such frames may be identified with a translating repeater, such as 12-1. The methods disclosed above are not exhaustive. Other methods for identifying and enabling specific translating repeaters 12 will be apparent to those skilled in the art.

In step 630, BTS 15 receives the configuration request and identifies the requesting translating repeater 12. If translating repeater 12 scans frequencies searching for an access channel in step 610, it is important that BTS 15 does not mistakenly consider the translating repeater's 12 configuration request to be a communication from a mobile user 18. However, this will generally not be the case. If the identifier transmitted by translating repeater 12 to BTS 15 includes the ESN of the transmitting translating repeater 12, BTS 15 will recognize that the transmitted signal is coming from a translating repeater 12, rather than a mobile user 18. Also, even if an ESN is not the identifier, the BTS 15 will recognize the distinct data format of the information transmitted by the translating repeater 12 as coming from a translating repeater 12, as opposed to coming from a mobile user 18.

In step 640, a remote control facility, such as BTS 15, identifies at least one groundlink and/or at least one backhaul frequency for use by the requesting translating repeater 12. A particular frequency allocation will generally be based on a frequency allocation plan for the frequency spectrum assigned to a cellular operator.

In step 650, BTS 15 transmits a list transmission including the designated groundlink and/or backhaul frequencies to translating repeater 12. The list transmission will normally be sent over a control channel. The requesting translating repeater 12 can be determined from the list transmission using techniques, such as those discussed in step 620. In addition to the backhaul and groundlink frequencies to which a particular translating repeater 12 should be set to, BTS 15 can also optionally provide the translating repeater 12 with other information. For example, handover and power control thresholds can be provided therein. In addition, alarm thresholds and alarm masks, BTS identifiers and other site specific information can be included with the list transmission.

Cite specific information provided in step 650 can also include neighbor lists, which can be used by translating repeaters 12 to reduce system backhaul control capacity requirements. Neighbor lists can facilitate hand-over to neighboring cells of calls made by mobile users 18 as a mobile user 18 moves from one cell to another cell by providing the mobile user 18 with frequencies assigned to neighboring cells.

In step 660, the requesting translating repeater 12 receives the BTS 15 list transmission and configures itself to begin operating on the designated groundlink and/or backhaul frequencies. Translating repeater 12 may continue to operate at the designated frequencies received in step 660 until it is determined such frequencies should be changed. For example, if there is a change in the frequency allocation plan for the frequency spectrum in which the groundlink and/or backhaul channels of the translating repeater are situated, it may become necessary to reconfigure the groundlink and/or backhaul channels of affected translating repeaters 12. In the case of reconfiguration, the method described above for initial frequency configuration may be simplified.

A method is now provided for automatically re-configuring the backhaul and/or groundlink frequencies for a translating repeater 12 using wireless signaling. For example, frequency reconfiguration is generally required if there is a change in the frequency allocation plan for the frequency spectrum in which groundlink and/or backhaul frequencies of BTS 15 are allocated to cells served. Reconfiguration can be provided using the method described in FIG. 6 along with some minor modifications.

Specifically, in the case of frequency reconfiguration, translating repeater 12 is not a requesting translating repeater. Thus, steps 610–630 are not required for frequency reconfiguration of a translating repeater 12. Steps 640–660 generally apply to reconfigurations. However, as noted, translating repeater 12 is not a requesting translating repeater 12 during frequency reconfiguration. In addition, it is noted that one or more backhaul frequencies can be changed without a change in a corresponding groundlink frequency. Similarly, one or more groundlink frequencies can be changed without a change in a corresponding backhaul frequency. Moreover, after completing a re-configuration of a first translating repeater 12, BTS 15 will generally proceed to reconfigure the other translating repeaters 12 which serve the other cells hosted by BTS 15.

It should be understood that the examples and embodiments described herein are for illustrative purposes only and that various modifications or changes in light thereof will be suggested to persons skilled in the art and are to be included within the spirit and purview of this application. The invention can take other specific forms without departing from the spirit or essential attributes thereof for an indication of the scope of the invention.

What is claimed is:

1. A method for automatically configuring a wireless repeater in a cellular communication system, comprising the steps of:

selecting a predetermined repeater configuration that is to be assigned to any repeater that is installed in a predetermined cell;

storing at a remote control facility a unique identifying characteristic exclusively associated with a specific repeater that is installed or intended for installation in said predetermined cell; and automatically providing said predetermined repeater configuration to said specific repeater based exclusively on said unique identifier using a wireless transmission link between said specific repeater unit and said remote control facility.

2. The method for automatically configuring a wireless repeater in claim 1, wherein said predetermined repeater configuration includes at least one selected from the group consisting of a neighbor list, at least one groundlink channel, at least one backhaul channel, handover thresholds, alarm thresholds, alarm masks and at least one backhaul power level.

3. The method for automatically configuring a wireless repeater in claim 1, further comprising the step of storing said predetermined repeater configuration at said remote control facility.

4. The method for automatically configuring a wireless repeater in claim 1, wherein said remote control facility is at least one base transceiver station (BTS).

5. The method for automatically configuring a wireless repeater in claim 4, wherein said unique identifying characteristic is a time interval used by said BTS wireless transmission.

6. The method for automatically configuring a wireless repeater in claim 4, wherein said unique identifying characteristic is an identifying code included in said BTS wireless transmission.

7. The method for automatically configuring a wireless repeater in claim 1, wherein said providing step is responsive to a wireless configuration request transmitted by said specified repeater.

8. The method for automatically configuring a wireless repeater in claim 7, wherein said unique identifying characteristic is included in said configuration request.

9. The method for automatically configuring a wireless repeater in claim 8, wherein said unique identifying characteristic is an electronic serial number (ESN) assigned to said specified repeater.

10. The method for automatically configuring a wireless repeater in claim 7, wherein said specified repeater is identifiable through a time interval used during transmission of said configuration request.

11. The method for automatically configuring a wireless repeater in claim 7, wherein said configuration request is transmitted over a channel identified by said specified repeater by scanning through a list of frequencies transmitted by said BTS.

12. The method for automatically configuring a wireless repeater in claim 7, wherein said configuration request is transmitted over at least one control channel.

13. The method for automatically configuring a wireless repeater in claim 7, wherein said configuration request is sent over a channel reserved for said configuration requests.

14. An apparatus for automatically configuring a wireless repeater in a cellular communication system, comprising:

means for storing in a remote control facility a predetermined repeater configuration that is to be assigned to any repeater that is installed in a predetermined cell;

means for identifying a specific repeater that is installed or is to be installed in said predetermined cell based on an identifying characteristic unique to said specific repeater; and means for automatically providing said predetermined repeater configuration to said specific repeater based exclusively on said unique identifier using a wireless transmission link between said specific repeater and said remote control facility.

15. The apparatus for automatically configuring a wireless repeater in claim 14, wherein said predetermined repeater configuration includes at least one selected from the group consisting of a neighbor list, at least one groundlink channel, handover thresholds, alarm thresholds, alarm masks, at least one backhaul channel, and at least one backhaul power level.

16. The apparatus for automatically configuring a wireless repeater in claim 14, wherein said remote control facility is at least one base transceiver station (BTS).

17. The apparatus for automatically configuring a wireless repeater in claim 16, wherein said unique identifier is a time interval used by said BTS wireless transmission.

18. A The apparatus for automatically configuring a wireless repeater in claim 16, wherein said unique identifier is an identifying code included in said BTS wireless transmission.

19. The apparatus for automatically configuring a wireless repeater in claim 14, wherein said means for providing is responsive to a wireless configuration request transmitted by said specified repeater.

20. The apparatus for automatically configuring a wireless repeater in claim 19, wherein said unique identifier is included in said configuration request.

21. The apparatus for automatically configuring a wireless repeater in claim 20, wherein said unique identifier is an electronic serial number (ESN) assigned to said specified repeater.

22. The apparatus for automatically configuring a wireless repeater in claim 19, wherein said unique identifier comprises a time interval used during transmission of said configuration request.

23. The apparatus for automatically configuring a wireless repeater in claim 19, wherein said configuration request is transmitted over a channel identified by said specified repeater by scanning through a list of frequencies transmitted by said BTS.

24. The apparatus for automatically configuring a wireless repeater in claim 19, wherein said configuration request is transmitted over at least one control channel.

25. The apparatus for automatically configuring a wireless repeater in claim 19, wherein said configuration request is sent over a channel reserved for said configuration requests.

* * * * *